(12) United States Patent
Bhaskar et al.

(10) Patent No.: US 6,801,337 B2
(45) Date of Patent: *Oct. 5, 2004

(54) TONE DEPENDENT VARIABLE HALFTONING WITH ADJUSTABLE ALGORITHM SELECTION

(75) Inventors: Ranjit Bhaskar, Vancouver, WA (US); Kevin R. Hudson, Camas, WA (US); Jay S Gondek, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,107

(22) Filed: Jun. 9, 2003

(65) Prior Publication Data

US 2003/0214677 A1 Nov. 20, 2003

Related U.S. Application Data

(63) Continuation of application No. 09/338,847, filed on Jun. 23, 1999, now Pat. No. 6,661,533, which is a continuation of application No. 09/048,919, filed on Mar. 26, 1998, now Pat. No. 6,002,804.

(51) Int. Cl.$^7$ ............................................. G06F 15/00
(52) U.S. Cl. ...................... 358/1.9; 358/522; 358/523; 358/530; 382/252
(58) Field of Search ...................... 358/1.9, 2.1, 448, 358/463, 530, 535, 522, 523, 515, 518, 534, 429, 456; 382/252, 162

(56) References Cited

U.S. PATENT DOCUMENTS

| | | | |
|---|---|---|---|
| 4,413,275 A | 11/1983 | Horiuchi et al. | |
| 4,500,919 A | 2/1985 | Schreiber | |
| 4,680,645 A | 7/1987 | Dispoto et al. | |
| 4,866,514 A | 9/1989 | Yeomans | |
| 4,974,171 A | 11/1990 | Yeh et al. | |
| 5,031,050 A | 7/1991 | Chan | |
| 5,091,734 A | 2/1992 | Suzuki et al. | |
| 5,131,075 A | 7/1992 | Wilkes et al. | |
| 5,168,552 A | 12/1992 | Vaughn et al. | |
| 5,519,791 A | 5/1996 | Webb et al. | |
| 5,602,971 A | 2/1997 | Deschuytere | |
| 5,731,823 A | 3/1998 | Miller et al. | |
| 5,970,178 A | 10/1999 | Lin | |
| 5,982,951 A | * 11/1999 | Katayama | .................... 382/284 |

(List continued on next page.)

FOREIGN PATENT DOCUMENTS

| | | |
|---|---|---|
| EP | 0 349 234 A | 1/1990 |
| EP | 0 390 473 A2 | 10/1990 |
| EP | 0 488 534 A2 | 6/1992 |
| EP | 0 493 085 A2 | 7/1992 |

OTHER PUBLICATIONS

EPO/Patent Abstracts of Japan; Osawa Hideshi; Pub. No. 63205238; Aug. 24, 1988; 1 page.
EPO/Patent Abstracts of Japan; Idei Katsuto; Pub. No. 59163945; Sep. 17, 1984; 1 page.
Allen W. J. et al; HP DeskWriter C Printer Driver Development;Aug. 1992 Hewlett–Packard Journal pp 93–102.

*Primary Examiner*—Jerome Grant, II

(57) ABSTRACT

Optimally determined halftoning algorithms are applied to tone values by selecting among combinations of at least two algorithms that best address the tradeoff between output quality and rendering performance. Input tone values are scrutinized and matched with the algorithm combination that processes the associated tone values in a manner that increases performance (including data compressibility) without sacrificing output quality. The selection process is computationally simple and fast. Reliability is ensured because the combinations of halftoning algorithms are tabulated as a result of analysis of test samples of the printed output.

8 Claims, 3 Drawing Sheets

U.S. PATENT DOCUMENTS 6,002,804 A * 12/1999 Bhaskar ...................... 382/252
6,040,927 A    3/2000 Winter
6,257,693 B1    7/2001 Miller
6,661,533 B1 * 12/2003 Bhaskar ...................... 358/1.9

* cited by examiner

TONE DEPENDENT VARIABLE HALFTONING WITH ADJUSTABLE ALGORITHM SELECTION

This is a continuation of application Ser. No. 09/338,847 filed Jun. 23, 1999 now U.S. Pat. No. 6,661,533, which is a continuation of application Ser. No. 09/048,919 filed Mar. 26, 1998, now U.S. Pat. No. 6,002,804.

BACKGROUND AND SUMMARY OF THE INVENTION

Digital halftoning can be defined as a collection of techniques employed by various computer-controlled display and printing devices for converting continuous-tone images into binary information for displaying the image. The display is comprised of many individual picture elements, known as "pixels." The computer generates data corresponding to the tone of the pixels to be displayed or printed. Hereafter, this data will be alternatively referred to as input tone values or tone value data.

The conversion and display of the tone value data is often referred to as rendering. As part of the rendering, the tone value data is associated with halftoning cells with which the display area is logically tiled. The pixels of those cells are colored (printed or displayed) in accord with the underlying halftoning technique. The halftoning techniques, or algorithms, can be generally broken-down into two classes.

One class comprises those algorithms that are relatively simple from a computational standpoint, thus providing good rendering speed. Exemplary of this first class of halftoning algorithms are those known as matrix-based, pattern, or ordered-dither algorithms. One of these is named for its originator, B. E. Bayer. (*An Optimum Method for Two-Level Rendition of Continuous-Tone Pictures, Proc. IEEE Int. Conf. Communication*, pp. 2611–2615, 1973.)

In one version of the Bayer algorithm, an 8×8 matrix of pixels defines the halftoning cell. Each of the 64 pixels in the matrix has associated with it a threshold value. The computer-generated tone value data (for example, levels from 0 to 255 of the colorants, cyan, magenta, and yellow) that correspond to each pixel of the cell are compared with the threshold level of the corresponding position in the matrix. If the tone value of the pixel is greater than the threshold value, an output pixel is produced (as by printing) with the appropriate colorant(s). For convenience, the remainder of this discussion will generally refer to printed output, although it is understood that the particulars of the present invention are applicable to other display devices.

These matrix-based algorithms, such as Bayer's, are computationally fast since they only require a comparison between the tone value and the threshold value. In addition, small matrices, on the order of 8×8 cells, generate output data streams (i.e., output tone values) that are amenable to speed-enhancing data compression inasmuch as the output data stream will contain many repeating bytes.

The advantages attributable to such a small-matrix based algorithm and its attendant repetitive output stream, however, may be overshadowed in certain instances, such as where generally light color tones are to be uniformly applied over a significantly sized area of the printed image. In such instances, the repetitive output data (generated, as it is, from an ordered-dither matrix) and the limited number of printable patterns introduces a noticeable and generally undesirable artifact in the printed image. The artifact is known as patterning.

Another class of halftoning algorithms includes those generally labeled as "error diffusion." A popular version of an error diffusion halftoning algorithm is known as Floyd-Steinberg error diffusion. (*An Adaptive Algorithm for Spatial Grayscale*, Proc. SID, 17:75–77, 1976). With this technique, the tone value of each pixel is examined (for colored output, the tone values include those of each colorant) and compared to a threshold value provided by the algorithm. If the incoming tone value exceeds the threshold, an output pixel is generated and the difference between the output and input values (error) is diffused among four neighboring pixels. For example, the pixel immediately to the right of the current pixel is assigned $7/16$ of the error (the error can be positive or negative), the pixel beneath that one is assigned $1/16$ of the error, the pixel beneath the current pixel is assigned $5/16$ of the error, and the pixel to the left of that one is assigned $3/16$ of the error.

To further break-up geometric artifacts or patterns, some noise may be added to the error terms. The averaged value of the noise is 0, however, so that the image is not lightened or darkened as a result.

Error diffusion algorithms can enhance output quality (as compared to matrix-based algorithms) by the elimination of the patterning artifacts mentioned above. This advantage comes at a computational cost, however, that can reduce performance in terms of pixel throughput. Printing speed is reduced. This is particularly true in instances where noise is introduced into the error terms because the already somewhat-random appearing output is, as a result, made even more so, thus making the output data stream unsuitable for compression.

Selection of an algorithm from one or the other of the two groups outlined above, therefore, necessarily requires one to address the trade-off between rendering speed and compressibility (for which matrix-based algorithms are advantageously employed) and output quality (for which error diffusion approaches work best).

In the past, methods incorporated into and carried out by printer drivers or the like have been used for selecting between or otherwise blending algorithms from the two groups identified above. Such approaches, while producing acceptable results, introduce computational complexities of their own, thereby losing some of the performance gains that may otherwise be obtained.

The present invention is directed to a method and apparatus for optimally varying the halftoning algorithms applied to tone values by selecting among combinations of at least two algorithms that best address the tradeoff between output quality and rendering performance.

In a preferred embodiment of the invention, input tone values are scrutinized and matched with an algorithm combination that processes the associated tone values in a manner that increases rendering speed (including the use of data compression) without sacrificing output quality. As explained in detail below, the selection process is computationally simple and fast.

Moreover the process is reliable; providing predetermined combinations of halftoning algorithms that are established as a result of analysis of actual test samples of the printed output.

The somewhat subjective weighting of the speed versus output-quality that comes about when predetermining the algorithm combinations can be readily adjusted or "tuned" to accommodate other weightings. Such tuning does not, however, affect the computational simplicity of the process.

Notwithstanding the simplicity of the algorithm selection process, the overall color tone space can be optimized—with respect to speed and output quality—to within a respectably high resolution.

Other advantages and features of the present invention will become clear upon study of the following portion of this specification and drawings.

DETAILED DESCRIPTION OF PREFERRED EMBODIMENTS

Figure 1:
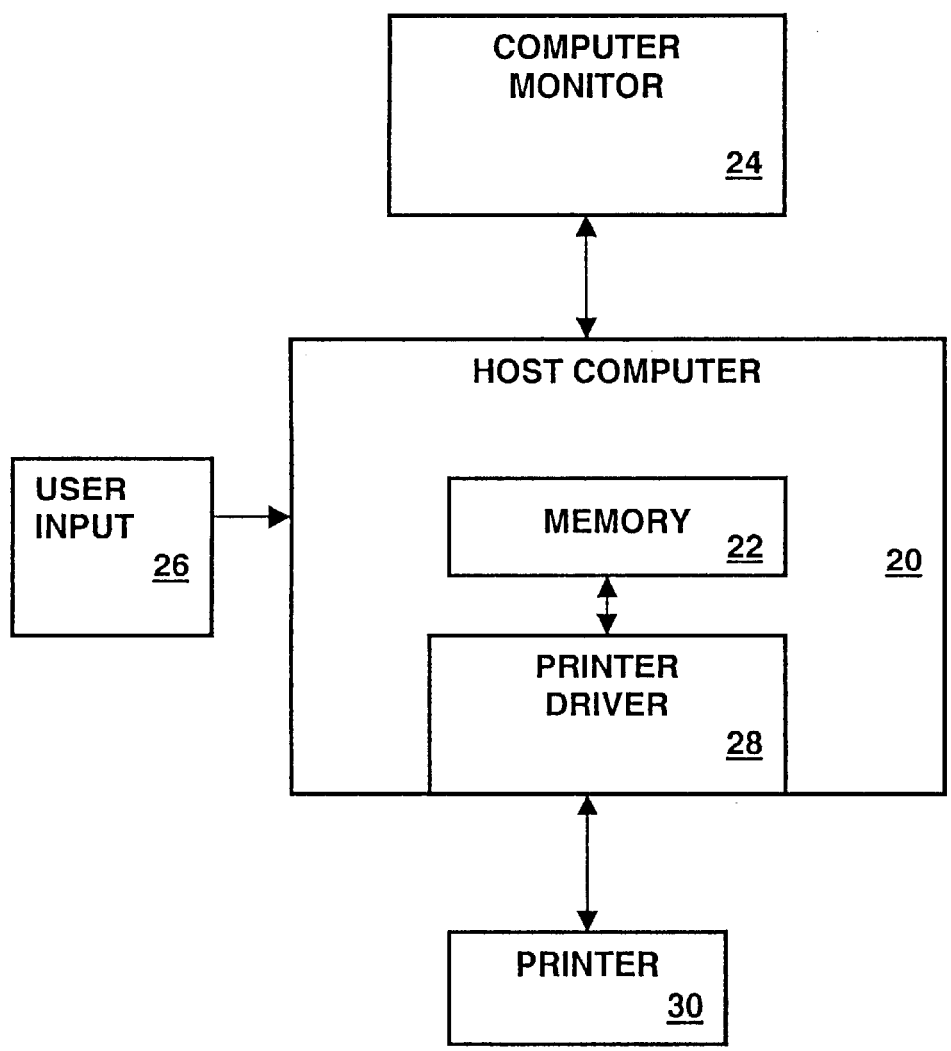
FIG. 1 is a diagram of a computer-controlled printing system with which the method of the present invention may be carried out.

FIG. 1 depicts a diagram of a computer-controlled printing system with which the process of the present invention may be carried out. For example, the host computer 20 may be any conventional personal or workstation-type computer. A monitor 24 provides the user with a display of computer generated information. The information may be derived from a number of sources, including graphics or word processing applications running on the computer's operating system. A user input device 26, such as a keyboard or scanner, provides the computer with input for generating or otherwise manipulating images for display.

Memory 22 in the form of RAM and disk-based storage is integrated with the computer, and its contents available to the computer, printer driver, etc via an internal bus. A color printer 30 is provided for producing output that matches that displayed on the monitor 24. Any of a number of printing devices may be employed, such as those known as Ink-Jet type, manufactured by Hewlett-Packard Company of Palo Alto, Calif. Such printers employ the colorants (ink) cyan, yellow and magenta that, in a subtractive sense, are combinable to produce a palette of colors that match those displayed.

In a preferred embodiment, the host computer memory is loaded with a program known as a printer driver 28 (shown separately in FIG. 1) that, among other things, enables a wide variety of applications to work with a particular printer. The printer driver may, alternatively, be loaded in memory that is carried in the printer 30.

Figure 2:
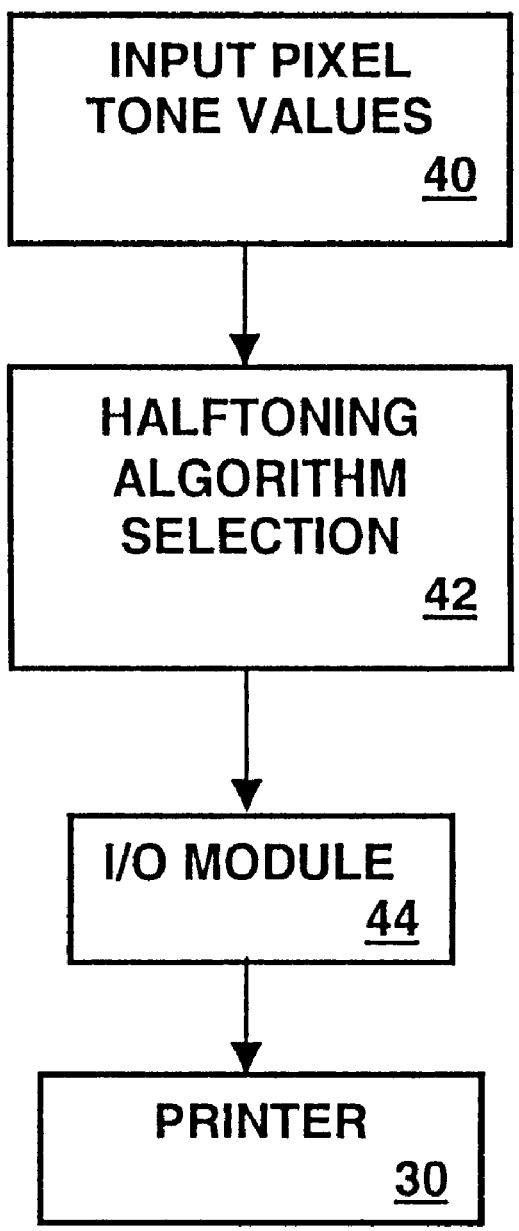
FIG. 2 is a diagram outlining the primary steps of the invention.

A portion or module of the printer driver 28, designated as the Halftoning Algorithm Selection Module 42 (see FIG. 2) may carry out the method of the present invention. In the regard, the Halftoning Algorithm Selection Module receives bytes of the input tone values 40 corresponding to each of the cyan, yellow, and magenta colorants to be applied via the printer 30 to generate the image.

The pixel tone values 40 may vary incrementally, in conventional fashion, from a non-existent level represented as a decimal number 0 to a dark or saturated level represented by decimal number 255. The range, therefore, includes 256 possible values for each color.

As explained more fully below, the method of the present invention notes and compares the absolute levels (from decimal 0) and relative levels of each colorant component of the pixel's color tone values. The process then selects a particular combination of matrix-based and error diffusion-type halftoning algorithms to apply to the tone values of the components assigned to a particular pixel tones. The output tone values from the algorithms are used in rendering the color via the printer 30.

As will become clear, the selection of algorithm combinations yields the user an output that provides a pre-evaluated tradeoff between rendering performance (speed) and output quality (appearance).

As one aspect of the present invention, the algorithm selection process is undertaken with very little additional computational requirements. To this end, the optimal combinations of halftoning algorithms are tabulated in advance and correlated to indices representing a large number of possible input tone value combinations. The tabulation is preferably in the form of a tone lookup table, incorporated in the printer driver 28, the construction of which table is discussed next.

A preliminary step in the lookup table construction process—and one that enhances the overall predictability of the halftoning algorithm selection process—is to analyze the output of a particular printer and inks. A set of color combinations is printed for various levels of each colorant and for various combinations of colorants. For example, such a set can be generated by printing the colors at intervals of 16 decimal-value levels (0, 15, 31 . . . 255).

Each set is printed with various combinations of matrix-based halftoning algorithms and error diffusion algorithms, and the results are observed to particularly discern which colors and combinations of colors are produced without the sometimes-characteristic patterning artifacts discussed above. For colors and color combinations that lack the artifacts, the matrix-based halftoning algorithm is identified in the table and correlated to the tone values that make up that particular patterning-free color or color combination. Put another way, in instances where the matrix-based algorithm performs without artifacts, that algorithm is selected over the error diffusion-type to exploit the speed/compressibility advantages inherent in that algorithm as discussed above. In some instances, the tone value of one colorant treated with the error diffusion algorithm (to eliminate artifacts) had the effect of masking the patterning artifacts produced by the matrix-based algorithm in the other, corresponding colorant.

This description turns now to a particular example of a tone lookup table constructed in accord with the present invention. The above described analysis was carried out, and it was observed that portions of the color set output from pixel input values of solely the yellow colorant (liquid ink, applied by the above-mentioned type of ink-jet printer) were produced without patterning by the matrix-based halftoning algorithm—irrespective of the absolute tone level of that color.

Thus, for a pixel tone value comprising the application of solely yellow colorant (as opposed to a pixel tone value that has contributions of yellow with cyan or magenta, or both), the input tone values can be immediately treated with the matrix-based halftoning algorithm, as explained more below.

The substance of the lookup table is thus devoted to the resolution of which algorithm combination is to be correlated with which combinations of (levels) of cyan and magenta colorant. In this regard, the above described analysis revealed that at darker tones of these colorants, artifacts that are produced by the matrix-based halftoning algorithm, and that might otherwise be observed at lighter color levels, are sometimes hidden by the combined, dark tones. Thus, in instances where the cyan and magenta input tone values are high, the matrix-based halftoning algorithm may be applied to both colorants of the pixel. It is not necessary to consider the yellow tone values when cyan and magenta colorants are present in the same pixel because any patterning artifacts that might be present in these darker tones would be present irrespective of the level of the yellow colorant.

Analysis of a mixture of light or medium levels of cyan with light or medium levels of magenta permitted tabulation of combinations of halftoning algorithms that are correlated to (dependent on) the particular tone value of both colorants. For instance, low tone levels of cyan in the presence of very low (or absent) magenta levels will require the error diffusion-type halftoning algorithm to prevent easily observed patterning. Thus, the tone values for the cyan colorant are applied to the error diffusion algorithm, while the corresponding magenta tones may be rendered using the matrix-based algorithm.

Analysis of a mixture of low levels of cyan in the presence of high levels of magenta showed that the cyan pixel values may be treated by the matrix-based algorithms because the high levels of magenta (which values needed treatment by error-diffusion) masks any patterning artifacts.

At mid-level ranges of both cyan and magenta, patterning by cyan may not be masked by the magenta. Thus, input tone values calling for such combinations of cyan and magenta must have both the cyan and magenta values applied to the error-diffusion algorithm to avoid patterning artifacts.

In view of the foregoing, the method of the present invention may be carried out to produce a tone lookup table, a portion of which is incorporated in Table I, below:

the second and third columns of Table I) that the matrix-based halftoning algorithm is applied to both the cyan and magenta input tone values for rendering. This is consistent with the foregoing, where it was mentioned that dark tones of both cyan and magenta tend to mask the undesirable patterning artifacts that would result from the application of the matrix-based algorithm.

A low value of the cyan tone value, say 00111111, and an nearly absent magenta contribution, say 00000011, will, following the above discussed steps 50–56, result in a tone-lookup-table index of 48, which correlates (see Table I) to a halftoning algorithm selection reference "1" that calls for error-diffusion for the cyan values, while the matrix-based algorithm will suffice for the magenta tone values.

A low value of the cyan tone value, say 00111111, and a high magenta tone value, say 11011100, will, following the above discussed steps 50–56, result in a tone-lookup-table index of 61, which correlates (see Table I) to a halftoning algorithm selection reference "2" that allows the matrix-based algorithm for the cyan tone values, while error diffusion is called for with the magenta tone values.

Combinations of mid- to upper midlevels of both cyan and magenta tone values produce colors where the patterning artifacts cannot be masked. Thus, error diffusion is the required algorithm for both color tones. As an example, a cyan level of 1010111 and a magenta level 10110100 will result in a tone-lookup-table index of 171, which correlates (see Table I) to a halftoning selection reference "3" for error diffusion algorithms for both colors.

| TONE-LOOKUP-TABLE INDEX | ALGORITHM TO WHICH CYAN TONE VALUES ARE APPLIED | ALGORITHM TO WHICH MAGENTA TONE VALUES ARE APPLIED | HALFTONING SELECTION REFERENCE |
|---|---|---|---|
| 48 | ERROR DIFFUSION | MATRIX BASED | 1 |
| 61 | MATRIX-BASED | ERROR DIFFUSION | 2 |
| 171 | ERROR DIFFUSION | ERROR DIFFUSION | 3 |
| 254 | MATRIX-BASED | MATRIX-BASED | 0 |

With reference to Table I and FIG. 3, the mechanics of noting the input tone values of each colorant and comparing the relative values are now discussed in connection with a preferred embodiment.

Figure 3:
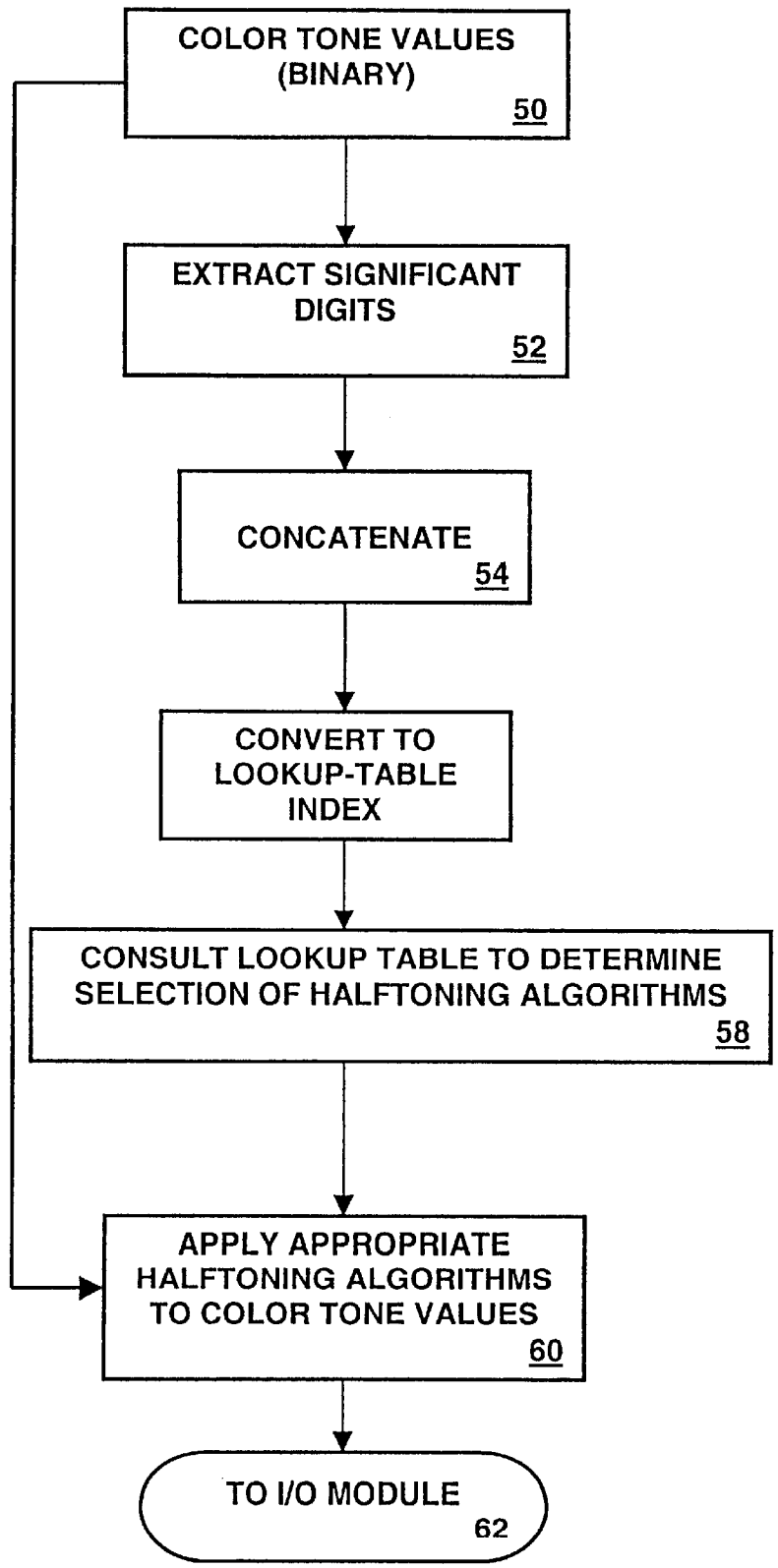
FIG. 3 is a flow diagram of the particular steps undertaken by the halftoning algorithm selection aspect of the present invention.

The input color tone values for each colorant are received in binary form by the above described halftoning algorithm selection module diagrammed in FIG. 3 (step 50). If those values show that no cyan or magenta levels are present, the matrix based algorithm is immediately assigned, as explained above in connection with yellow colorants.

In instances where cyan and/or magenta tone values are present, the significant four bits of the cyan and magenta tones are extracted, thereby to reduce these levels to the nearest multiple of 16 (step 52).

The extracted significant bits are then concatenated (step 54), cyan first, into a one-byte number that, in a preferred embodiment, is converted into decimal form to arrive at a tone-lookup-table index (step 56).

For example, if high values of 11110000 and 11101111 (240, and 239 decimal, respectively) for cyan and magenta are received, the significant four bits are extracted and concatenated as noted into the one-byte number 11111110, which, converted to decimal, yields a tone-lookup-table index of 254. This value is then used to index into tone lookup table (step 58) where the value of the associated halftone selection reference is identified as "0." (See the last row of Table I). This reference means (as is apparent from Once the appropriate algorithms are selected and applied, the resulting output tones are provided to the input/output module of the printer driver (step 62) for delivery to the printer.

It will be clear to one of ordinary skill that the foregoing process, which, as noted, may be stored in computer readable medium as part of a printer driver, provides a fast, halftoning selection or optimization scheme since the halftoning algorithm combinations are pre-determined. No computation or decision-making is involved during pixel rendering, except for consulting the lookup table and for retrieval/selection of the halftone selection reference therein.

Moreover, the process produces desired results across full spectrum provided by the display device because the tabulation is made from an analysis of test samples generated by that device. As noted earlier, the somewhat subjective weighting of the performance-versus-output-quality that comes about when tabulating the algorithm combinations can be readily revised or "tuned" to accommodate other weightings. Such tuning does not, however, affect the computational simplicity of the process.

In a preferred embodiment, computational efficiency was found when the tone color space—256 levels—was divided (using the four significant digit extraction approach mentioned above) into 16 different levels (256 levels when both cyan and magenta are considered). Thus, fairly small regions of the tone space are optimized to a high level, irrespective of the optimization level of adjacent regions.

The description of present embodiment mentions Bayer and Floyd-Steinberg as exemplary of the matrix-based and error diffusion-type halftoning algorithms, respectively. It is clear, however, that the present system is amenable to any equivalent approaches, some of which are spelled out in a prominent text in this area: R. Ulichney, *Digital Halftoning, MIT Press*, 1987.

Moreover, although the halftoning algorithm combinations considered only two classes of such algorithms, it is contemplated that other classes of halftoning algorithms may be analyzed together with the other two to arrive at combinations of three or more algorithms. It will be recognized that the consideration of more classes of algorithms may complicate the analysis leading to the construction of the lookup table, although it will not substantively add to the computational complexity of the process inasmuch as the simple lookup table would still be employed.

Thus, while the present invention has been described in terms of a preferred embodiment, it will be appreciated by one of ordinary skill that the spirit and scope of the invention is not limited to those embodiments, but extend to the various modifications and equivalents as defined in the appended claims.

What is claimed is:

1. A method for selecting among different halftoning algorithms to apply to pixel tone value data, which data include at least two components, the method comprising the steps of:

combining the components to form an index; and matching the index with one of a plurality of stored indices, each of the stored indices being correlated to predetermined combinations of at least two halftoning algorithms, the predetermined combinations representing halftoning algorithms to apply to each component of the pixel tone value data in rendering the data to a display device.

2. The method of claim 1 wherein the matching step comprises:

producing beforehand a number of different portions of an image on the display device by using several halftoning algorithm combinations to produce the portions; and tabulating for each of the stored indices a selected halftoning algorithm combination, thereby to provide the predetermined combinations.

3. The method of claim 2 wherein the halftoning algorithm combinations include a first class and second class of halftoning algorithms, and wherein the first class of halftoning algorithms is selected from a group of halftoning algorithms that can render the pixel tone value data more rapidly than the second class of halftoning algorithms of the group, and wherein the tabulating step includes the step of:

determining the selected combinations from the first and second classes of halftoning algorithm.

4. The method of claim 3 including the step of assigning error diffusion-type halftoning algorithms to the first class of algorithms.

5. The method of claim 3 including the step of assigning matrix-based or ordered-dither type halftoning algorithms to the second class of algorithms.

6. The method of claim 1 wherein the combining step includes the step of concatenating the most significant four bits of data bytes that represent the components of the pixel tone value data.

7. The method of claim 1 wherein the stored indices that are correlated to predetermined combinations of at least two halftoning algorithms are stored prior to the matching step.

8. A method for selecting among at least two halftoning algorithms to apply to pixel tone value data streams that represent the tone values of two or more colorants to be applied to pixels in rendering a colored image, the method including the steps of:

comparing, for a given pixel, the tone values of at least two of the colorants;

noting the results of the comparison; and based upon the results of the comparison, selecting for each colorant tone value a halftoning algorithm to apply to the colorant tone values for the given pixel.

* * * * *